United States Patent [19]

Rouquette

[11] Patent Number: 5,214,617

[45] Date of Patent: May 25, 1993

[54] HYDROACOUSTIC RANGING SYSTEM

[75] Inventor: Robert E. Rouquette, Kenner, La.

[73] Assignee: The Laitram Corporation, New Orleans, La.

[21] Appl. No.: 872,721

[22] Filed: Apr. 13, 1992

Related U.S. Application Data

[63] Continuation of Ser. No. 717,916, Jun. 14, 1991, Pat. No. 5,142,507, which is a continuation of Ser. No. 482,657, Feb. 21, 1990, Pat. No. 5,031,159.

[51] Int. Cl.$^5$ ............................................. G01S 15/00
[52] U.S. Cl. ................................................. 367/124
[58] Field of Search ............... 367/19, 125, 124, 130, 367/106, 134; 114/242

[56] References Cited

U.S. PATENT DOCUMENTS

| | | | |
|---|---|---|---|
| 3,614,721 | 10/1979 | Lagoe | 367/130 |
| 3,665,464 | 5/1972 | Meilander . | |
| 3,780,370 | 12/1973 | Reeves . | |
| 4,164,036 | 12/1977 | Wax . | |
| 4,187,492 | 2/1980 | Delignieres | 367/130 |
| 4,275,398 | 6/1981 | Parker et al. . | |
| 4,894,810 | 1/1990 | Jukkala | 367/118 |
| 5,031,159 | 7/1991 | Rouquette | 367/19 |

FOREIGN PATENT DOCUMENTS

| | | |
|---|---|---|
| 0447783A3 | 6/1989 | European Pat. Off. . |
| 2620536A1 | 3/1989 | France . |
| WO87/04527 | 7/1987 | World Int. Prop. O. . |

Primary Examiner—Daniel T. Pihulic
Attorney, Agent, or Firm—Laurence R. Brown; James T. Cronvich

[57] ABSTRACT

Apparatus and method for transmitting and receiving hydroacoustic pulses used to determine the spatial separations between pairs of such apparatus. According to a preferred embodiment, the apparatus transmits hydroacoustic pulses having a selected shape and frequency at specific times and also determines the time of arrival of received hydroacoustic pulses having a known shape and carrier frequency. Included is a transducer for converting the hydroacoustic energy received from a body of water into electrical energy and for converting electric pulses into hydroacoustic pulses which are then coupled into the body of water. Electric pulses having a selected shape and carrier frequency are digitally synthesized in response to a count comparator. A first electrical transmission path is provided by the apparatus for conducting the electrical pulses from the synthesizer means to the transducer, and a second electrical path is provided for receiving the electrical energy from the transducer and converting the electrical energy into a sequence of digital samples representative of the amplitude of the received electrical energy and consequently of the received hydroacoustic energy. Also included is a detection means which correlates the sequence of digital samples with a set of coefficients representative of the known shape and carrier frequency of the received hydroacoustic pulses. The detection means further computes a sequence of correlation values from the coefficients and selects from these values a group of relative maximum correlation values which indicate the reception of hydroacoustic pulses.

22 Claims, 11 Drawing Sheets

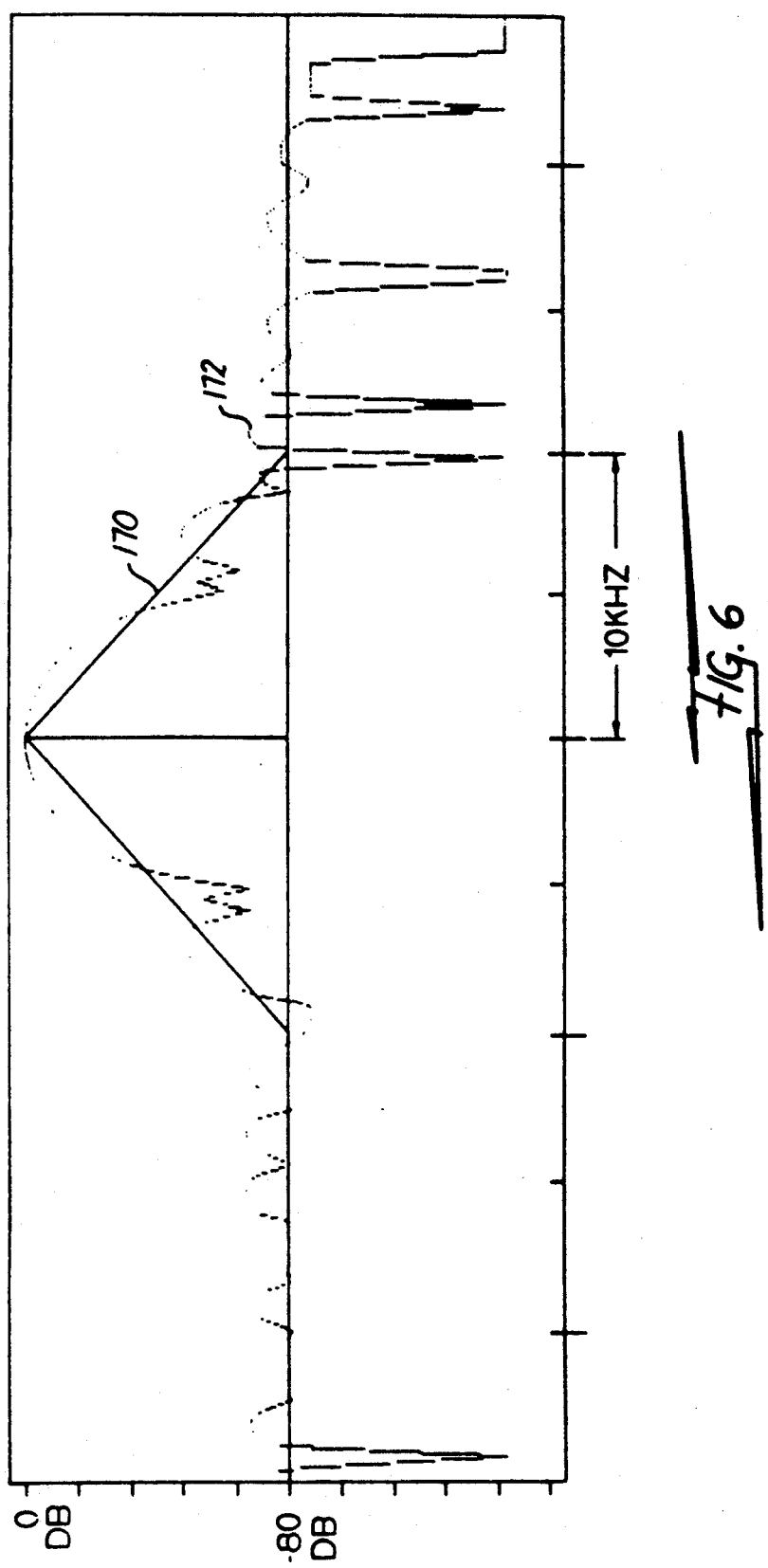

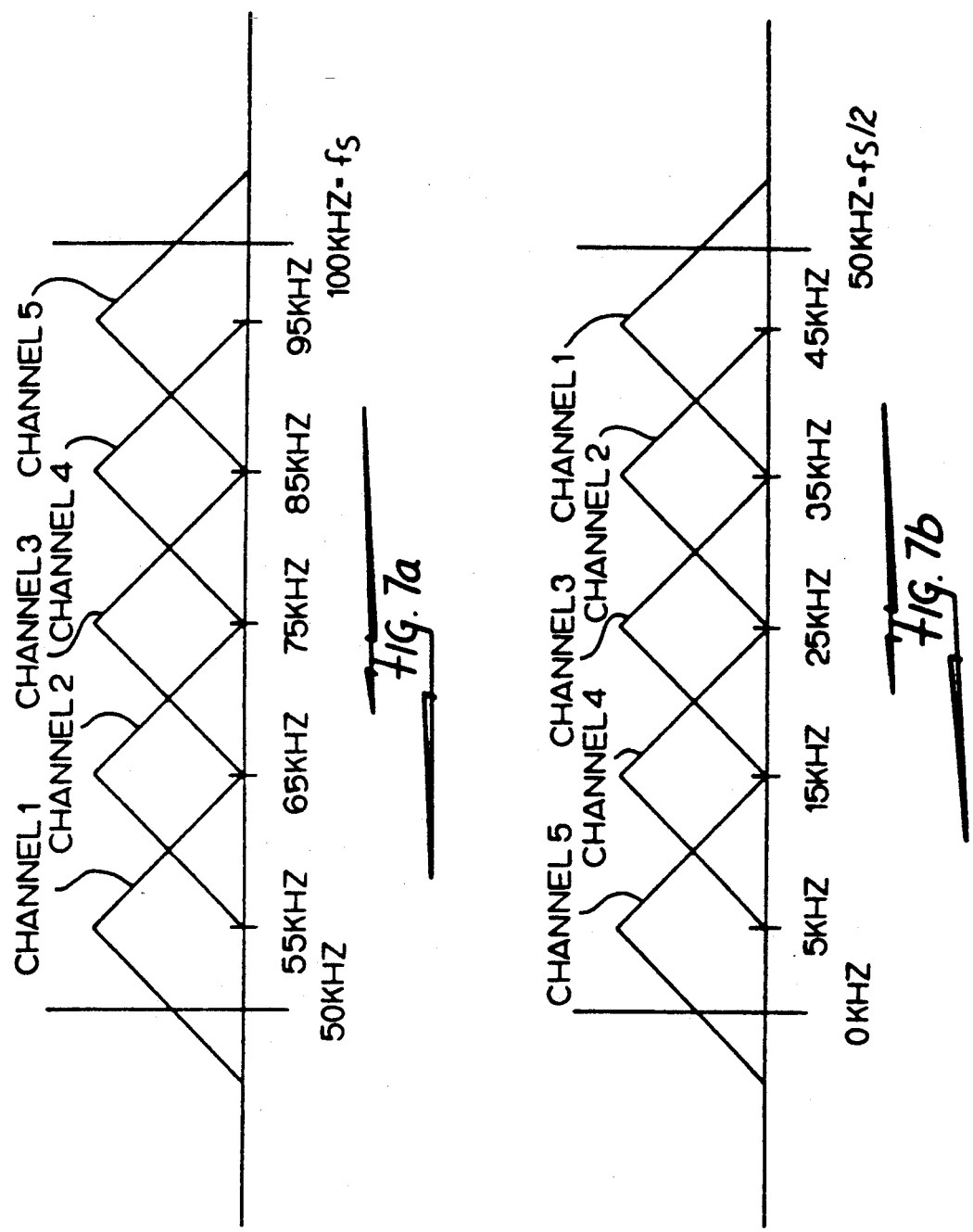

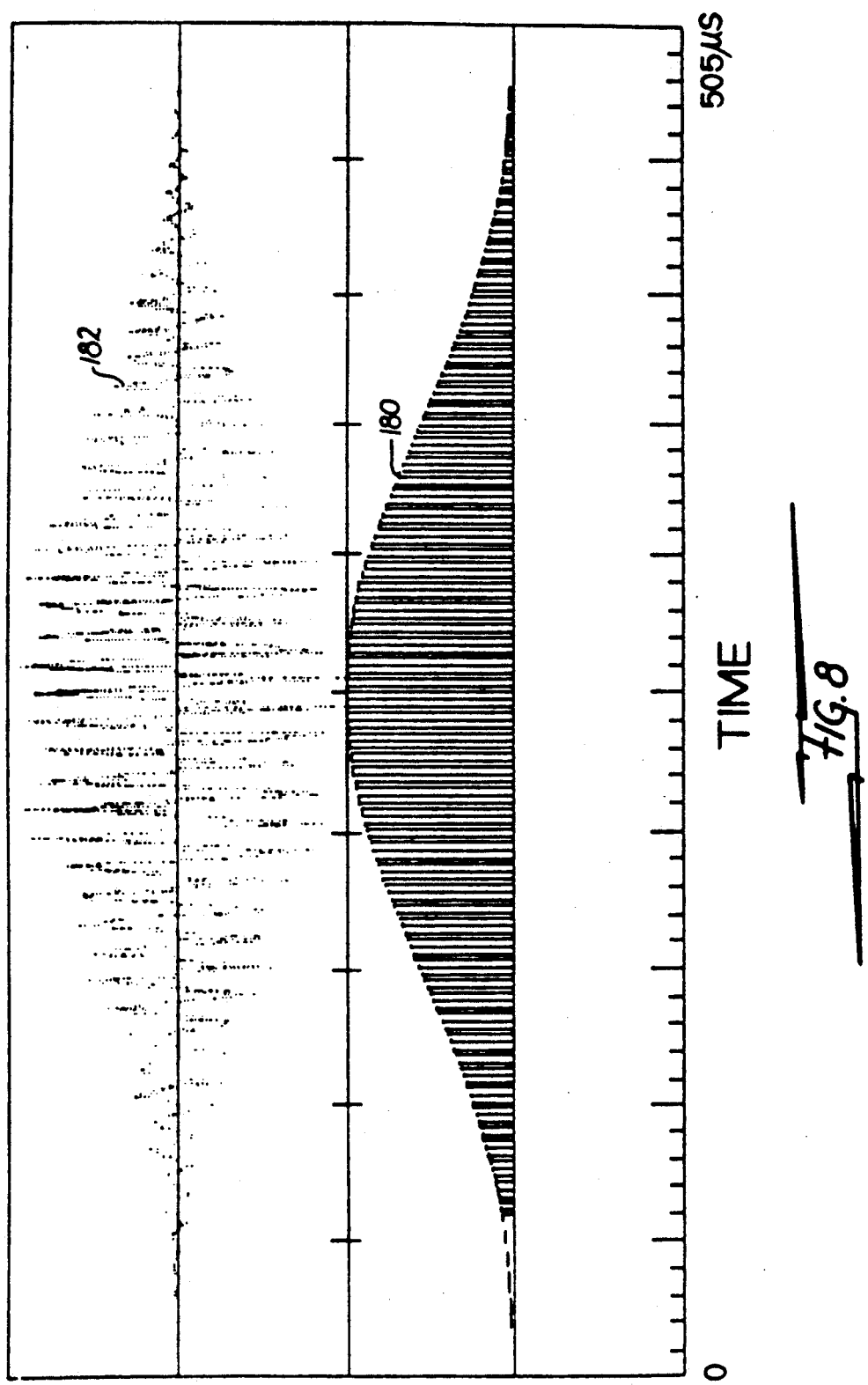

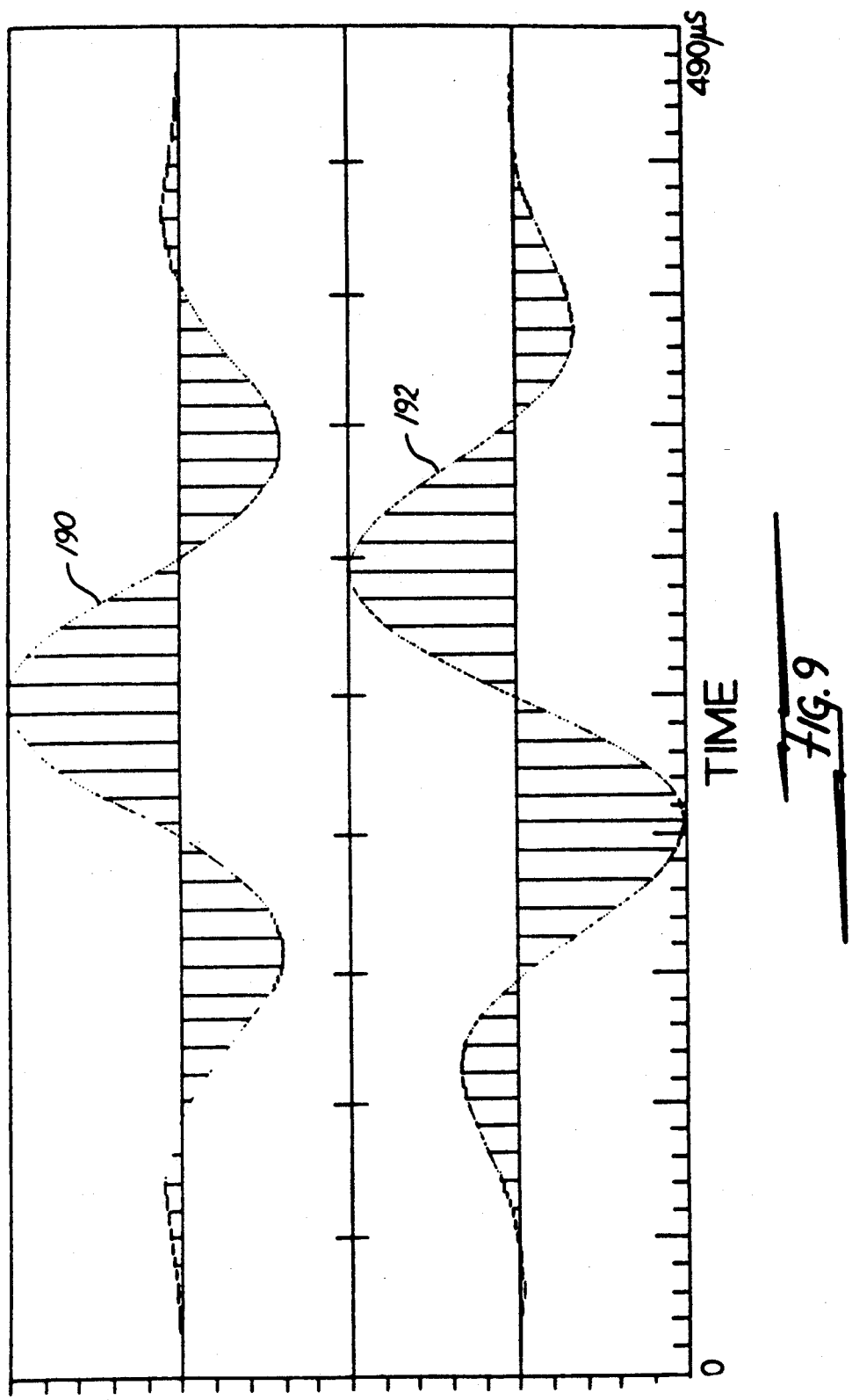

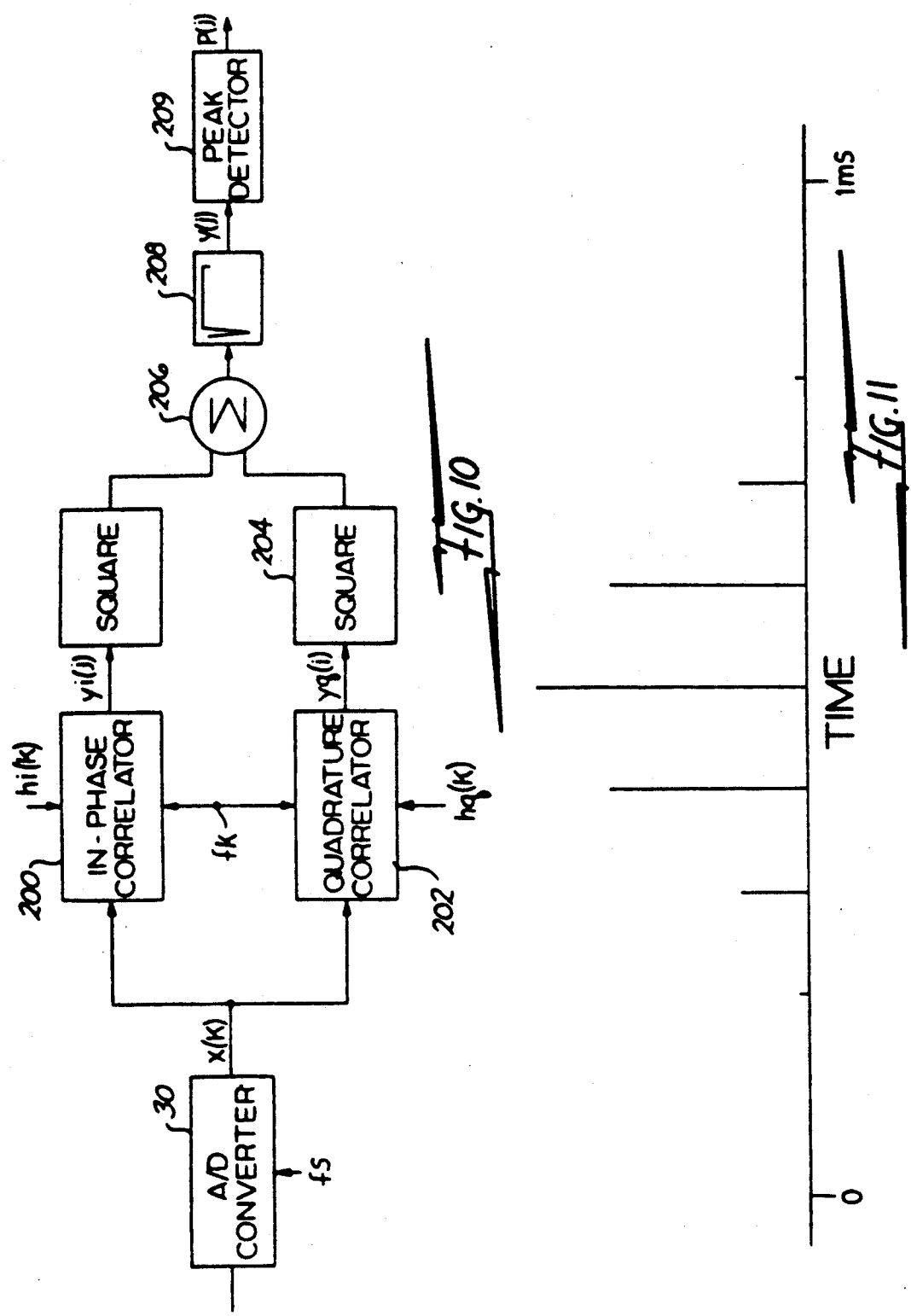

HYDROACOUSTIC RANGING SYSTEM

This application is a continuation of Ser. No. 07/717,916 filed Jun. 14, 1991, now U.S. Pat. No. 5,142,507, Aug. 25, 1991; which in turn is a continuation of Ser. No. 07/482,657, filed Feb. 21, 1990, now U.S. Pat. No. 5,031,159, Jul. 9, 1991.

TECHNICAL FIELD

This invention relates to apparatus for transmitting and receiving hydroacoustic pulses used to determine the spatial separation between pairs of such apparatus. More particularly, the invention is a preferred embodiment relates to high-frequency hydroacoustic transceivers using digital-signal-processing devices and deployed at known positions along the lengths of towed hydrophone streamers for the purpose of determining their shapes and geodetic positions.

BACKGROUND OF THE INVENTION

In search of geologic formations likely to trap oil or gas, the offshore seismic exploration industry surveys the outer layers of the earth's crust beneath the ocean by towing an array of hydrophones behind a boat, periodically firing a source of acoustic energy, recording the responses of the hydrophones to reflections of the acoustic energy from geologic formations, and processing the seismic hydrophone data. The hydrophone array is linearly arranged in a streamer whose depth is controlled. The streamer, which may be a few kilometers long, may also include a head buoy tethered to the head end of the streamer and a tail buoy to the tail end as surface references.

Historically, only one streamer containing the hydrophone array was deployed from the exploration boat during a survey. The accuracy of the survey depended on, among other things, the accuracy of the estimate of the shape of the hydrophone streamer and the accuracy of the positioning of a known point on the streamer.

One way the shape can be estimated is by mechanically modeling the streamer and computing its dynamic performance under various towing speeds and ambient conditions. The accuracy of the estimation is, of course, only as good as the model. Placing magnetic compasses and depth sensors along the streamer represented an improvement in streamer shape estimation. Data representing the depth and magnetic heading of sections of the streamer are sent from the distributed compasses and depth sensors to a controller on board the tow boat for immediate computation of streamer shape and for storage of the raw data for later detailed processing. Accurate shape estimation is achieved in this way.

As important as estimating the streamer's shape is tying its position to a geodetic reference. Typically, radiopositioning receivers aboard the boat are used to tie a spot on the boat to a geodetic reference. Accurate optical positioning systems, such as a laser, are then used to tie the front buoy to the geodetic reference. It is also common to have a radiopositioning receiver aboard the tail buoy to fix its position. The positions of the distributed compasses and depth sensors with respect to the buoys is then estimated based on a model of the streamer and the buoy tethers. Inaccuracies in the model result in absolute errors in transgerring the geodetic reference from the buoys to the streamer. Furthermore, the performance of optical positioning systems degrades with inclement weather.

An important advance in the exploration for oil and gas is the development of the three-dimensional seismic survey, often using more than one hydrophone streamer. With multiple streamers towed behind one or more boats, more seismic hydrophone data can be gathered in much less time than with a single streamer, resulting in a significant reduction in exploration costs. With multiple streamers, accurate estimations of the positions of the hydrophone streamers with respect to each other and to the acoustic source are essential. Fortunately, multiple streamers towed more or less in parallel provide a geometry favorable for determining the positions of the streamers with respect to each other, to the boat, to the acoustic source, or gun, and to the buoys by means of acoustic ranging. With individual hydroacoustic transceivers positioned along the streamers, on the acoustic source, on the boat or boats, and on the buoys, acoustic transit times of pulses transmitted by the transceivers and received by neighboring transceivers can be telemetered to the controller on the boat where a position solution can be performed and the raw data stored for further processing. Using the speed of sound through the water, the controller converts the transit times into spatial separations between pairs of transceivers in developing the position solution. With information from a radiopositioning system and from depth sensors and compasses positioned along the array, the position solution is complete.

In a typical three-dimensional survey run using more than one streamer, the towing boat or boats follow a more or less constant heading at a more or less constant speed through the survey field. Waves, wind, current, and inevitable variations in boat speed and heading continuously affect the shapes of the streamers. Periodically, for example, every ten seconds, the acoustic source, or gun, is fired. An impulse of compressed air is forced into the water creating a bubble. The collapse of the bubble causes an acoustic pulse that radiates through the water and into the earth. Reflections of the pulse off geologic structures are picked up by the hydrophones and data representing these reflections are sent to the controller on the boat. Each firing of the gun and the associated interval during which the acoustic echoes are detected is known as a shot point. It is important that data sufficient to perform a complete position solution for each shot point be available. For a group of long streamers with acoustic transceivers distributed along each, many acoustic ranges must be measured. In theory, it would be best if all of the ranges to be measured could be determined simultaneously before the streamer has a chance to change its shape and position. Unfortunately, that is not possible in practice. The idea, then, is to measure all the acoustic ranges in as little time as possible, which requires a high throughput for each transceiver.

The separation between a pair of transceivers is generally measured by either one-way or two-way ranging. In one-way ranging, the first transceiver transmits a hydroacoustic pulse at time $t_s$. The pulse propagates through the water where it is received by the other transceiver at time $t_r$. The time difference $t_r - t_s$ is proportional to the spatial separation of the two transceivers. For an accurate one-way ranging measurement, the timers of both transceivers must be closely synchronized because the value $t_s$ is determined by the transmitting transceiver while the value $t_r$ is determined by the receiving transceiver. In two-way ranging, each transceiver transmits a pulse, the first at time $t_{1s}$ and the second at $t_{2s}$. The first receives the second's pulse at time $t_{1r}$, and the second receives the first's pulse at time $t_{2r}$. Even if the timers of both transceivers are not synchronized, the spatial separation is proportional to $[(t_{1r}-t_{1s})+(t_{2r}-t_{2s})]/2$, because the offset between the timers is removed by the subtraction. Consequently, the precise synchronization required for one-way ranging is not needed in two-way ranging systems.

Although a two-way ranging system avoids the synchronization problem in one-way ranging, each transceiver in a two-way ranging scheme must do more processing, that is, each transceiver must receive a pulse for each range it is involved in measuring. The times of arrival of the received pulses and time of transmission of the transmitted pulse or their differences must be telemetered to the controller aboard the boat for each shot point. For a transceiver involved in the measurement of many ranges, a lot of data must be processed. Consequently, only a transceiver with a high throughput can be used effectively in a two-way ranging system.

Therefore, one object of this invention is to provide a hydroacoustic transceiver capable of the high throughput rates required for two-way acoustic ranging without the need for accurate time synchronization.

If all the transceivers on a ranging system transmit on only one frequency, the only way to measure the various ranges is by time-division multiplexing, i.e., staggering the transmissions in such a way that no two pulses transmitted by different transceivers can arrive at any receiver simultaneously. Such a requirement, in addition to causing a transmit scheduling nightmare, results in a long time to measure many ranges, which causes errors in the position solution.

Another object of the invention is to provide a transceiver capable of transmitting and receiving hydroacoustic pulses having selected characteristics.

A further problem with acoustic ranging is errors caused by multipath interference. The straight-line path from transmitting transceiver to receiving transceiver is the direct path, which is the path defining the actual spatial separation. Other paths are due to reflections of the transmitted pulse off the ocean surface or floor. Depending on the differences in the lengths of the reflected paths with respect to the direct path, the reflected pulses may interfere with the direct pulse. Such interference can be destructive, preventing or distorting the detection of the pulse, resulting in an error in determining the time of arrival of the direct pulse. In addition, the shorter the transmitted pulse the less susceptible it is to multipath interference and the greater is its spatial resolution. It is well known in the art that the narrower the pulse, the wider the transmitter and receiver bandwidths must be. In other words, there is a tradeoff between resolution (pulsewidth) and bandwidth.

Wider bandwidths for each pulse of a given carrier frequency require that each channel in a frequency-division-multiplexed system be separated further. Accommodating a wide range of carrier frequencies is difficult in typical hydroacoustic transducers.

One way of squeezing more channels in a given transducer's bandwidth is by synthesizing narrow transmit pulses and detecting them using a matched-filter receiver. With a matched-filter receiver, it is possible to achieve a lower pulsewidth-bandwidth product than with ordinary receivers. A true matched-filter receiver, however, cannot be realized in the linear analog transceivers typically used. Consequently, analog transceivers must sacrifice resolution to enjoy the flexibility afforded by more channels or must sacrifice frequency flexibility to improve resolution.

One technique used with analog transceivers to avoid the multipath problem is to sequentially transmit pulses on different channels and analyze the transit times measured on each channel. The idea is that, for the same reflected paths, the interference between the direct and reflected pulses is different at different frequencies and that, at one of the frequencies, the interference will not be destructive and the range measurement can be made. This use of frequency diversity to solve the multipath problem takes more time, because more than one pulse must be transmitted by each transceiver to get a valid range measurement.

Therefore, it is a further object of this invention to provide a hydroacoustic transceiver operating on a number of efficiently packed channels and transmitting hydroacoustic pulses sufficiently narrow to minimize multipath interference.

SUMMARY

These and other objects and advantages will be obvious and will in part appear hereinafter, and will be accomplished by the present invention which provides apparatus for transmitting narrow hydroacoustic pulses and for determining the times of arrival of received hydroacoustic pulses for the purpose of measuring the spatial separations between pairs of such apparatus. An example of such an apparatus is a hydroacoustic transceiver used as part of an acoustic-ranging system for estimating the positions and shapes of hydrophone streamers to improve the accuracy of a seismic survey. In such a ranging system, individual transceivers may be attached at various points along hydrophone streamers, on the gun, on the head buoy, on the tail buoy, on submerged towfish trailed from the buoys, or on the hull of the tow boat. A controller, some sort of processing device, on board the boat controls the operation of the system and collects data from the transceivers over communications links.

The invention teaches a transceiver having a transducer for converting hydroacoustic energy into electrical energy and vice versa. In a preferred embodiment, the transducer is a ceramic sphere having a bandwidth ranging from about 50 kHz to about 100 kHz. The transducer is alternately connected to either the transceiver's electrical transmission path or its reception path by means of a transmit/receive switch.

With the switch in the receive position, the transceiver is listening for pulses from other transceivers. The reception path conducts the electrical energy representative of the hydroacoustic energy impinging on the transducer to conversion means such as a sampling analog-to-digital converter, which converts the electrical energy at its input into a sequence of digital words, or samples, at its output. In a preferred embodiment, the reception path includes a highpass filter for attenuating the low frequency noise that can be significant in a marine environment. From the sequence of digital samples, detection means detect the presence of pulses transmitted from other similar transceivers, the pulses having known characteristics. In a preferred embodiment, the known characteristics are the shape of the pulse and its carrier frequency and the detection means is a multiple-channel digital filter realized in a digital-signal-processing (DSP) integrated circuit. Coefficients of the digital filter, stored in memory means such as an EPROM or RAM, are configured to detect pulses of the known shape on one of five known carrier frequencies, or channels, from about 50 kHz to about 100 kHz. The digital filter detects pulses on each channel by correlating the sequence of digital samples with the filter's coefficients. Relative maximum correlation values from the filter represent detected pulses, the magnitudes of the correlation values indicating their signal strengths. The time count of timer means at the detection of a pulse, representing the time of arrival of the pulse, is saved in memory. The detection means similarly saves the signal strength of each of the received pulses. The times of arrival and signal strengths of up to eight pulses can be saved.

While the transducer is connected to the transceiver's electrical transmission path, the transceiver outputs a hydroacoustic pulse of known shape and carrier frequency. In a preferred embodiment, one pulse is transmitted for each shot point on one of five carrier frequencies. The pulse is digitally synthesized in synthesizer means at the shot point rate. Count comparison means in cooperation with the timer determine the transmission interval by comparing the timer count with the value stored in a register. In a preferred embodiment the count of the timer is reset to zero when its count matches the count in the register. The times of arrival of received pulses are referenced to the time of transmission. The digitally synthesized pulse is converted into an analog signal by a 12-bit digital-to-analog converter and conducted to the transducer through the switch over an electrical transmission path including a bandpass filter for attenuating digital switching noise and a power amplifier for increasing the pulse's power to a level sufficient to be detected by other transceivers. The pulse is coupled into the water by the transducer. In a preferred embodiment, the transmit/receive switch is in the transmit position for about 500 microseconds for each shot point interval. To save power, the power amplifier is turned on only during the brief transmit time.

In a preferred embodiment, the timer, comparison means, detection means, and synthesizer means less the digital-to-analog converter are realized by a DSP chip, its support circuitry, and its operating machine code. A DSP chip is used because it is capable of quickly performing the many arithmetic and logical operations, such as those required in implementing a multiple-channel digital matched filter. With the DSP chip, high-throughput, near-simultaneous two-way acoustic ranging with good multipath rejection on two or more streamers is possible.

In a typical application, the transceivers are attached to the streamer at various positions, to the head and tail buoys, to the gun, to towfish, and to the hull of the boat. Before deployment while the streamers are still on the deck of the boat, each transceiver is configured by the controller over the communications link. Parameters that can be configured include: a) the transmit frequency; b) the interrogate interval, i.e., the rate of transmission; c) the transmit time, i.e., the time to transmit relative to the resetting of the timer to zero, which occurs at the start of the interrogate interval or upon a master sync reset; d) the receive window open times and close times, i.e., the acceptance interval for each receive pulse relative to the start of the interrogate interval; e) the receive channel number (or carrier frequency); f) the receive detection threshold; and g) the receive time calibration value. The configurable parameters are stored in registers. Eight registers are reserved for each of items d–g, permitting the reception of up to eight pulses each shot point that meet the criteria defined by the corresponding settings of items d–g. In addition, each transceiver can be configured as a responder that transmits a pulse on a selected channel only upon reception of a pulse on a given channel. Responders are used in locations in the system, such as on the tail buoy, having no communications link with the controller on the boat. Communications over the link is between the controller and each transceiver over a party line. A microcontroller in each transceiver handles the communications and stores the configuration parameters in registers accessible by the DSP chip. In a preferred embodiment, multipath interference is rejected by ending the acceptance interval for a given pulse once it is detected.

During deployment and ranging, the controller aboard the boat loosely synchronizes each transceiver every so often over the communications link. When two-way ranging is practiced, synchronization to within a few milliseconds is adequate and can be done over the communications link. For each shot point, the transceiver sends time of arrival and signal strength data for up to eight pulses back to the controller on the boat, where it is processed and stored for further in-depth solution of the position and shape of the hydrophone streamer.

BRIEF DESCRIPTION OF THE DRAWINGS

The abovementioned features as well as other features of the present invention will be more clearly understood from consideration of the following description in connection with the accompanying drawings in which:

FIG. 6 shows the actual and the desired frequency response of the channel of a transceiver.

FIG. 7a shows the idealized frequency spectrum of the transmitted pulses for five channels.

FIG. 7b shows the idealized frequency spectrum of the received pulses for five channels undersampled at a frequency of 100 kHz.

FIG. 8 represents the actual transmitted pulse for a 95 kHz carrier and its envelope.

FIG. 9 represents the 50 in-phase and quadrature receiver correlation coefficients for a channel.

FIG. 10 is a block diagram of the pulse detection technique used in the preferred embodiment.

FIG. 11 shows the envelope autocorrelation function of a received pulse.

BEST MODE FOR CARRYING OUT THE INVENTION

Figure 1:
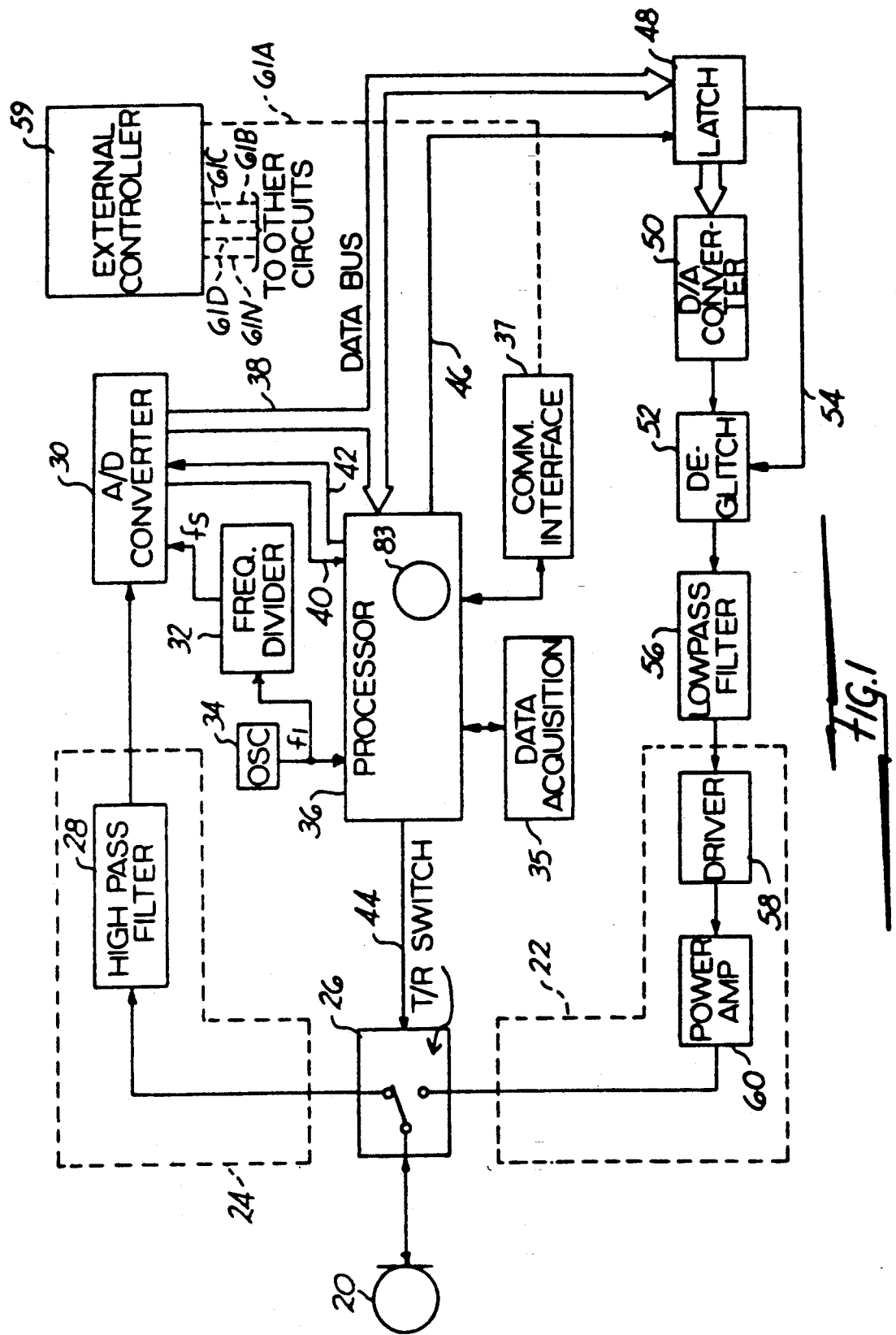
FIG. 1 is a block circuit diagram of one of the multiplicity of the transceivers used in the positioning apparatus of this invention.

Referring now to FIG. 1, there is shown a block diagram of the apparatus of this invention. A transducer 20 converts acoustic energy received through water into received electrical energy and reciprocally converts electrical pulses into acoustic pulses and couples them into the water. An example of such a transducer is a ceramic sphere having a fairly flat response from 50 kHz to 100 kHz and a more or less omnidirectional beam pattern. The transducer 20 is alternately connected to either an electrical transmission path 22 or an electrical reception path 24 by means of a T/R (transmit/receive) switch 26. The T/R switch of the preferred embodiment is an electromechanical single-pole, double-throw relay, although it will be appreciated that other types of switching could be used including solid state switches.

With the T/R switch 26 in the receive position as shown in FIG. 1, the transducer is connected to the electrical reception path 24. Included in the reception path is an active highpass filter 28 which provides a substantial voltage gain. In the preferred embodiment, the highpass filter 28 is a fourth-order Butterworth filter having a cutoff frequency of about 40 kHz, and a voltage gain of about 300. The filter attenuates noise in the 0-50 kHz range. Although the preferred embodiment uses an active filter with gain, it is also possible to use a separate preamplifier as a gain stage along with a passive highpass filter. Filtered electrical energy at the output of highpass filter 28 is sampled and converted into a sequence of digital samples by a sampling A/D (analog-to-digital) converter 30 which provides a 12-bit output. The sampling rate is determined by the output frequency $f_s$ of a frequency divider 32. The frequency divider divides the input frequency $f_1$ applied to it by a source of clock signals from an oscillator 34. In the preferred embodiment, the oscillator frequency $f_1$ is 20 MHz, the frequency divider 32 divides by a factor of 200 for a sampling rate $f_s$ of 100 kHz. Thus, the A/D converter 30 provides new samples at a rate of 100000 samples per second.

The 12-bit digital sample from the A/D converter 30 of the preferred embodiment is read by a processor 36 over its bidirectional data bus 38. An end of conversion signal 40 from the A/D converter 30 notifies the processor 36 that a digital sample is ready to be read. The processor then commands the A/D converter to output the digital sample to the bus 38 with an A/D read control signal 42. The processor as programmed implements a multiple-channel digital matched filter as a means for detecting the presence of acoustic pulses having known characteristics from the sequence of digital samples. The details of the detection are described hereinafter.

While the transducer 20 is connected to the electrical transmission path 22 as selected by transmit/receive control line 44 from the processor 36, electrical pulses synthesized under the control of the processor can be directed to the transducer for coupling into the water. In synthesizing a pulse to be transmitted, the processor 36 outputs a sequence of 12-bit digital words over the data bus 38. In the preferred embodiment, the sequence for a given pulse contains about 200 digital words. With successive words being output at a rate of 400000 words per second, the entire sequence spans about 0.5 ms, the duration of a transmit pulse. Successive digital words from the sequence are latched from the data bus 38 to the input of a 12-bit D/A (digital-to-analog) converter 50 at a rate of 400 kHz by a D/A latch signal 46 from the processor. The D/A converter converts the 12-bit digital word at its input into an analog voltage at its output. Because the analog output of the D/A converter is undefined during its conversion time, i.e., the interval commencing with the start of the conversion and ending with its completion, a deglitcher circuit 52 is used. During the conversion time, the deglitcher 52 shorts its output to ground. While the output of the D/A converter 50 is stable, the deglitcher 52 passes the output of the D/A converter directly to a lowpass reconstruction filter 56. Deglitcher control line 54 under processor control via latch 48 alternately switches the output of the deglitcher 52 between ground and the output of the D/A converter 50 as appropriate. The lowpass filter 56 smooths the output of the deglitcher 52, removing most of the digital switching noise. In the preferred embodiment, the filter 56 is a passive third-order Bessel filter, giving minimum phase distortion over the frequency range of the pulses. The waveform at the output of the filter 56 is that of the desired synthesized pulse.

The synthesized pulse from the filter is conducted to the transducer 20 over the electrical transmission path 22, which includes a driver 58 and a power amplifier 60. The driver 58 serves to buffer the low-voltage analog section from the high-voltage power amplifier 60. In the preferred embodiment, the driver 58 also provides a voltage gain of two to the synthesized pulse. The power amplifier 60, with an operating frequency range of about 50-100 kHz and a gain of about 32 dB into a nominal 100-ohm load, amplifies the pulse to the proper levels for transmission.

By means of the communications interface 37, the processor 36 is able to communicate with an external controller 59 by means of line 61A. Parameters defining the transmitter and receiver configurations can be selected at the controller and then sent to the processor 36 and stored in its memory. The controller can also synchronize processor 36 with the processors in a multiplicity of similar circuits by party lines on 61A or separate lines 61B through 61N over the interface. Furthermore, the times of arrival of received pulses and their signal strengths are sent to the external controller 59 over the interface 37. The processor 36 also reads data gathered by a data acquisition module 35 that may contain sensors such as pressure transducers for measuring the depth and temperature transducers for measuring the temperature of the sea water. The data from the data acquisition module can be sent to the external controller over the communications interface 37.

The synthesis of the transmit pulses is controlled by the processor 36 of FIG. 1 and the operating program stored in its memory. The flowchart of FIG. 2 describes the transmit subroutine used to synthesize a transmit pulse. When it is time to transmit a pulse, the transmit subroutine is called and program execution jumps to step 62 of FIG. 2. First, the sequence of digital words, or transmit coefficients, $c_N(i)$ corresponding to the carrier frequency, or channel N, over which the pulse is to be transmitted is selected based on the value in a transmit configuration register. The transmit configuration register is a location in the processor's memory that can be programmed over the communications interface 37 in FIG. 1. The transmit configuration register contains, in the preferred embodiment, one of six possible values. Values of one through five define channels $N=1$ through 5, or respective carrier frequencies of 55 kHz, 65 kHz, 75 kHz, 85 kHz, and 95 kHz. The sixth possible value, which is 0, disables the transmission of pulses. If, for example, the transmit configuration register contains a value of 3, a pulse with a carrier frequency of 75 kHz is synthesized.

Once the correct sequence of transmit coefficients is selected, the data pointer i is zeroed in step 64, pointing to the first member of the selected sequence $c_N(0)$.

Next, according to step 66, the deglitcher 52 in FIG. 1 is shorted via the latch 48 and the control line 54 in anticipation of a D/A conversion. The ith transmit coefficient $c_N(i)$ is put on the bus 38 and latched into the input of the D/A converter 50 via the latch 48 and D/A control line 46, and the conversion is begun. The processor then delays, step 70, for a time sufficient for the conversion to finish. After the delay, the short at the output of the deglitcher is disconnected and the output connected to the output of the D/A converter as shown in step 72. According to step 74, the data pointer i is then compared to the total number of coefficients XMTCNT in the sequence. In the preferred embodiment, XMTCNT=203. If the data pointer is less than the total number, execution continues to step 76. Otherwise, indicating that the entire sequence has been converted and pulse synthesis is completed, execution continues with steps 80 and 82, which short out the deglitcher and return execution to the main calling program. The data pointer i is incremented in step 76, pointing to the next consecutive transmit coefficient. Another processor delay is interposed by step 78, before execution resumes with step 66. The delays of steps 70 and 78 are chosen such that, during pulse synthesis, the deglitcher is shorted half the time and connected to the stable output of the D/A converter for the other half of the time. The delays are further chosen such that, in the preferred embodiment, one traversal of the loop defined from step 66 through step 78 and back to 66 takes 2.5 microseconds for an output sample rate of 400 kHz. The five sequences $c_N(i)$ are stored in the memory of the processor 36. To change to another set of synthesized signals requires only that the values in the memory be changed. Such a change could even be done over the communications interface 37. In an analog system, hardware would have to be replaced.

Means for detecting the presence of acoustic pulses from the sequence of digital samples from the A/D converter 30 in FIG. 1 are realized by a correlation routine executed by the processor 36. The A/D converter 30 produces new digital samples at a rate of 100 kHz as set by oscillator 34 and frequency divider 32. Upon the completion of each conversion, the A/D converter signals the processor 36 over the end of conversion line 40, which causes the processor to immediately execute an interrupt service routine. The routine, called A/D READ in FIG. 4, forces the A/D converter to put the digital sample on the data bus 38 by a signal on the A/D read line 42. The processor then reads the sample and saves it at the next available location in a circular buffer 83 in its memory. The circular buffer 83 of the preferred embodiment holds 50 samples. Once the buffer is filled, the next sample replaces the oldest of the 50 samples, so that the buffer always holds the 50 most recent samples. Step 124 in FIG. 4 performs this operation before returning to former program execution, as shown by step 126. At this point, it should be remembered that transmit pulses are synthesized by about 200 coefficients at a 400 kHz rate, creating a 0.5 ms pulse. Because the A/D converter in the receiver samples at only 100 kHz, 50 consecutive samples span a 0.5 ms interval, the width of a pulse. More transmit coefficients are used in order to simplify the hardware required to realize the lowpass reconstruction filter 56.

Figure 3:
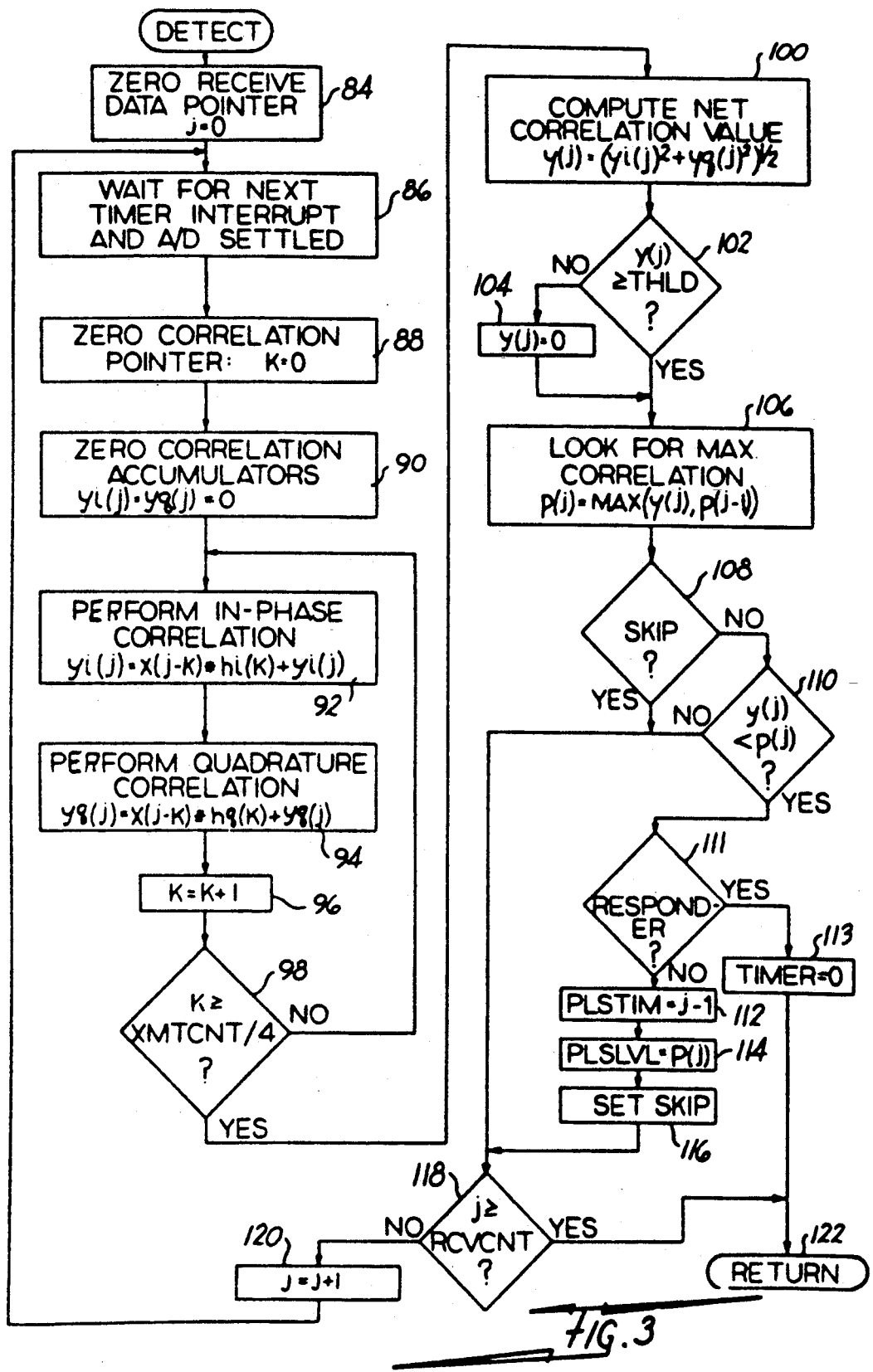

The correlation detector is implemented in the processor 36 by a detect routine flowcharted in FIG. 3. To simplify the drawing, the flowchart of FIG. 3 is drawn for detection of a pulse on a single channel. In fact, the detect routine can be performed simultaneously on up to five channels. The first step 84 of the routine zeroes the receive data pointer j, which is used as a count index relative to the start of the detection routine. At step 86, the processor waits for a timer interrupt, which occurs every 0.1 ms, or at a rate of 10 kHz. The timer interrupt routine is flowcharted in FIG. 4. Once the timer interrupt occurs and the A/D converter is read, execution continues to steps 88 and 90, which zero the correlation pointer k and the correlation accumulators yi(j) and yq(j). Iteratively executed steps 92, 94, 96, and 98 perform the in-phase and the quadrature correlations of the 50 most recent input samples x(j), j = −49 through 0, with the sequence of 50 in-phase correlation coefficients hi(k) and 50 quadrature coefficients hq(k) for the given channel. The coefficients are stored in the memory of the processor. A total of 500 coefficients are stored to cover the five channels. Just as the transmit coefficients $c_N$ could be modified without significant hardware changes, so could the correlation coefficients. As will be explained in detail hereinafter, the coefficients represent the known shape of the transmitted pulses for each channel. The iteration through steps 92, 94, 96, and 98 continues until the correlation pointer k, which is incremented each iteration, reaches one-fourth the number of values in the transmit pulse sequence. In the preferred embodiment XMTCNT=203 and XMTCNT/4=50. Consequently, each correlation accumulator represents the sum of 50 terms. In standard mathematical terms, the in-phase correlation is given by $yi(j)=\Sigma[x(j-k)hi(k)]$, and the quadrature correlation is given by $yq(j)=\Sigma[x(j-k)hq(k)]$, where the summation is over k from 0 to 49.

Once the correlation computations are completed, execution continues with step 100, which computes the net correlation value y(j), the vector sum of the in-phase and quadrature correlation values, or the square root of the sums of the squares of yi(j) and yq(j). In step 102, the net correlation value is compared with a receive threshold value THLD, which is a selectable value in a receive configuration register in the memory of the processor. If the net correlation value is less than the threshold value, the net correlation value y(j) is set to zero in step 104. In either case, execution continues to step 106, which determines the maximum correlation value. In step 106, the most recent net correlation value y(j) is compared to the previous maximum peak value p(j−1). If the most recent value is greater, it replaces the previous value in p(j). Otherwise, the previous value p(j−1) is put in p(j). Thus, p(j) contains the maximum correlation yet computed. Step 108 causes execution to bypass the peak detector implemented in steps 110, 112, 114, and 116 if the peak net correlation value has already been detected. If the peak net correlation value has not yet been detected, execution advances to step 110, which compares the most recent net correlation value y(j) with the maximum correlation value thus far p(j). If y(j) is less than p(j), the correlation values are beginning to decrease and the current y(j) is the first value beyond the peak. If the peak is detected and the apparatus is being operated as a responder, the time count of the timer is reset to zero and execution returns to the calling routine, as shown in steps 111, 113, and 122. If the peak is detected and operation is standard, execution advances to step 112, which saves the value of the data pointer coinciding with the peak (j−1) in a location in the processor's memory called PLSTIM. Because the data pointer is incremented each time a new correlation value is computed, i.e., every 0.1 ms, the data pointer serves as a timer producing periodic time counts. Step 112 provides a means for assigning a time count to the maximum correlation value, indicating the time of arrival of a pulse relative to the start of the detection routine. The signal strength of the received pulse, which is its peak correlation value p(j), is stored at location PLSLVL in the processor's memory in step 114. Step 116 sets the SKIP flag, which indicates that the peak has been determined. Regardless of the results of the decisions of steps 108 and 110, execution resumes with step 118, which determines whether pulse detection on the given channel is completed. A receiver configuration register in the processor's memory contains a value RCVCNT defining an acceptance interval relative to the start of the detection routine during which the correlation detection routine is operating on a given channel. When the data pointer j reaches the value of RCVCNT, program execution returns to its formerly running routine through step 122. Otherwise, the data pointer j is incremented in step 120, and execution loops back to step 86 to compute the next correlation value. It should be appreciated that the square-root function performed by step 100 could be eliminated without affecting the determination of times of arrival. If the step is eliminated, the net correlation values are merely the squares of the correlation values and the threshold values would have to be similarly squared. The purpose of the square-root step 100 of the preferred embodiment is to scale the net correlation value to the same units as the input samples.

Figure 4:
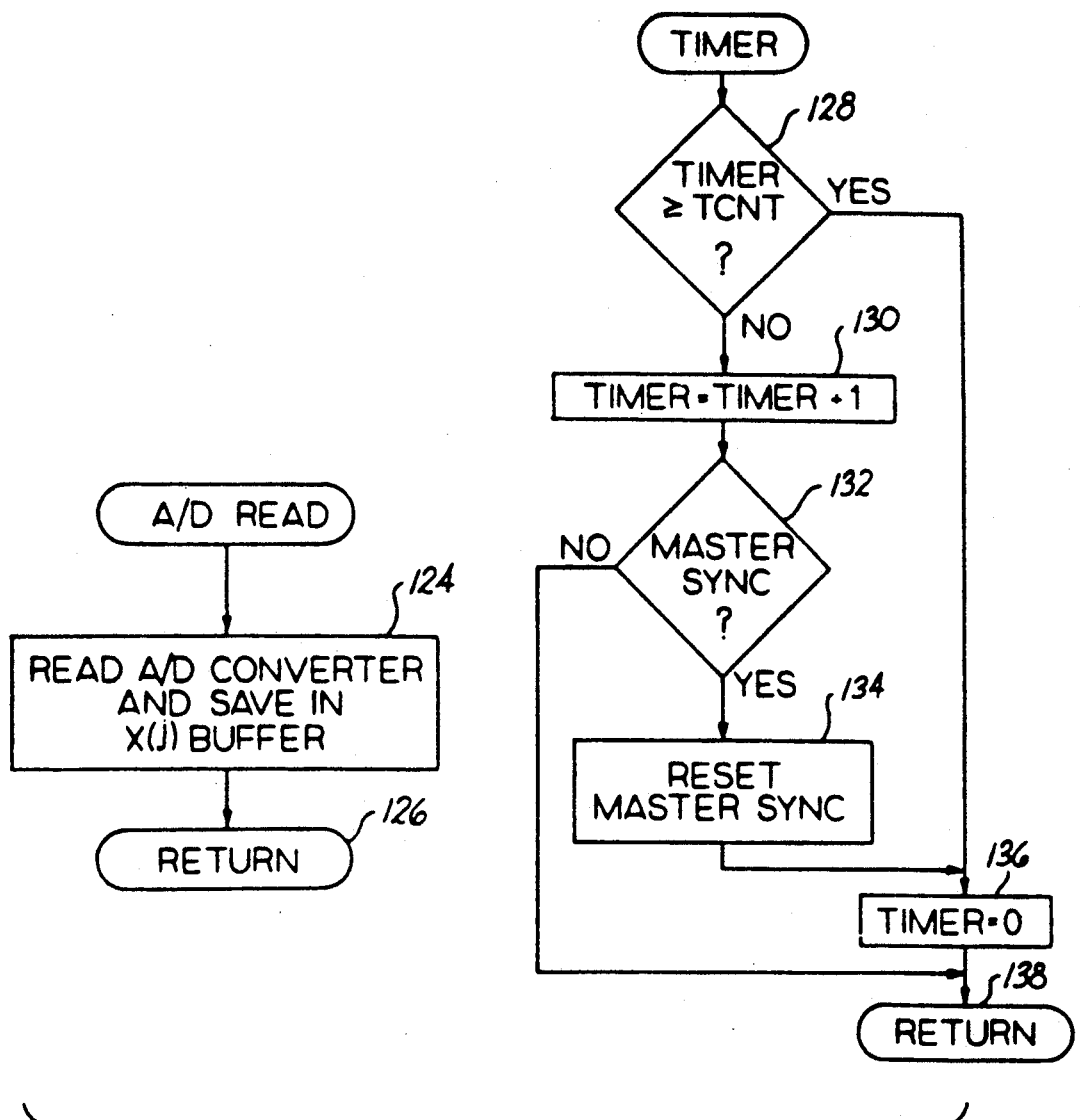

A software timer is implemented by the timer interrupt routine flowcharted in FIG. 4. The routine runs every 0.1 ms, or at a rate of 10 kHz. The oscillator 34 of FIG. 1 is the source of clock signals to which the rate of execution of the timer routine is referenced. Each time the timer routine runs, a time count stored in the processor's memory at a location labeled TIMER is incremented as shown in step 130. If the time count reaches a maximum time count TCNT, the time count is reset to zero as shown in steps 128 and 136. Furthermore, if a master sync command is received, the time count is reset to zero and the master sync is cleared so that the timer routine does not keep resetting the time count to zero as indicated by steps 132 and 134. A master sync command sent over the communications interface 37 in FIG. 1 is used to synchronize apparatus to each other, usually once each shot point. If the apparatus are not synchronized each shot point, TCNT defines an interrogate interval setting the transmission rate.

Figure 2:
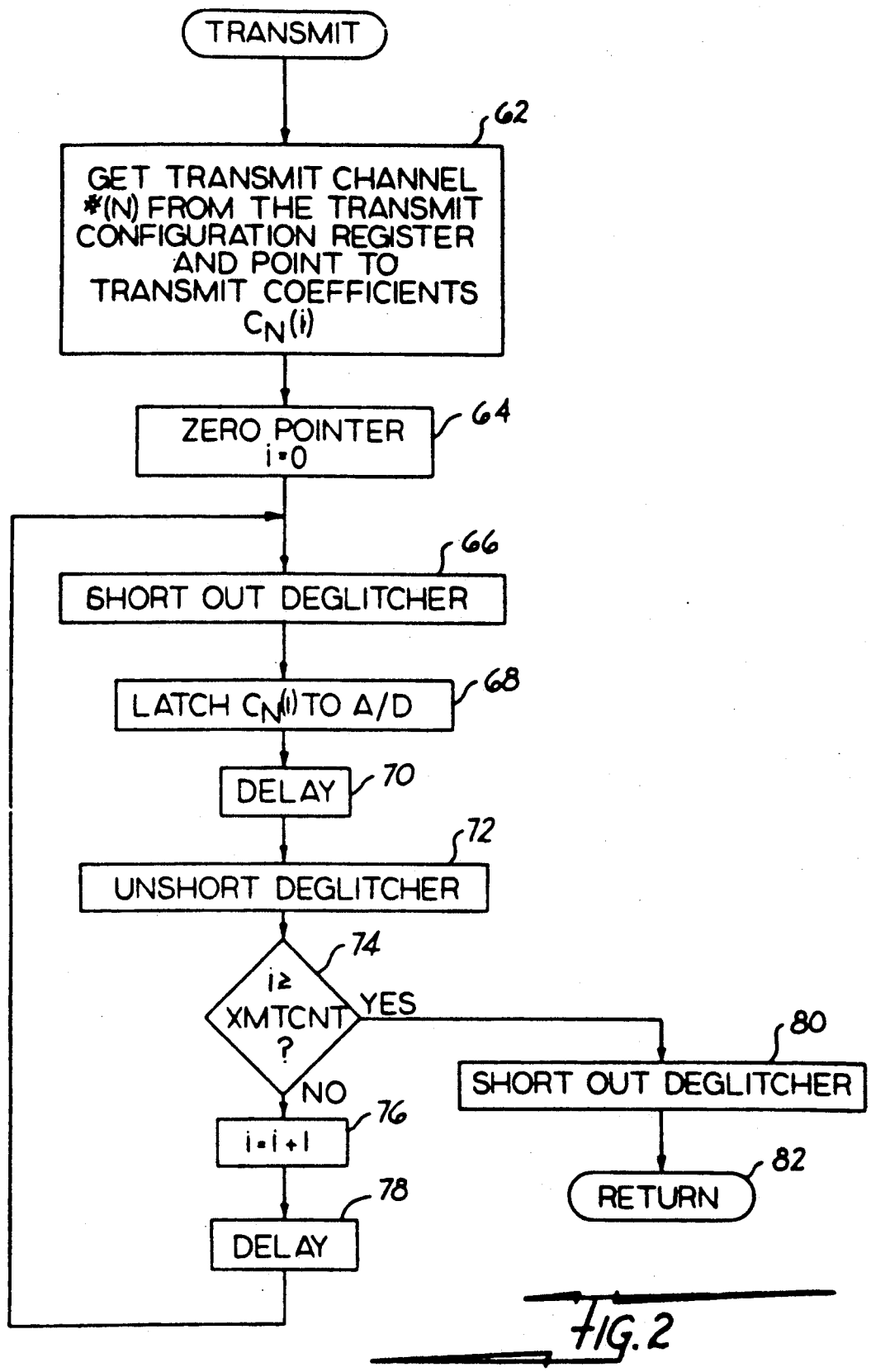
FIGS. 2 through 5 are flow diagrams representing the program of the processor located in the transceivers.
Figure 5:
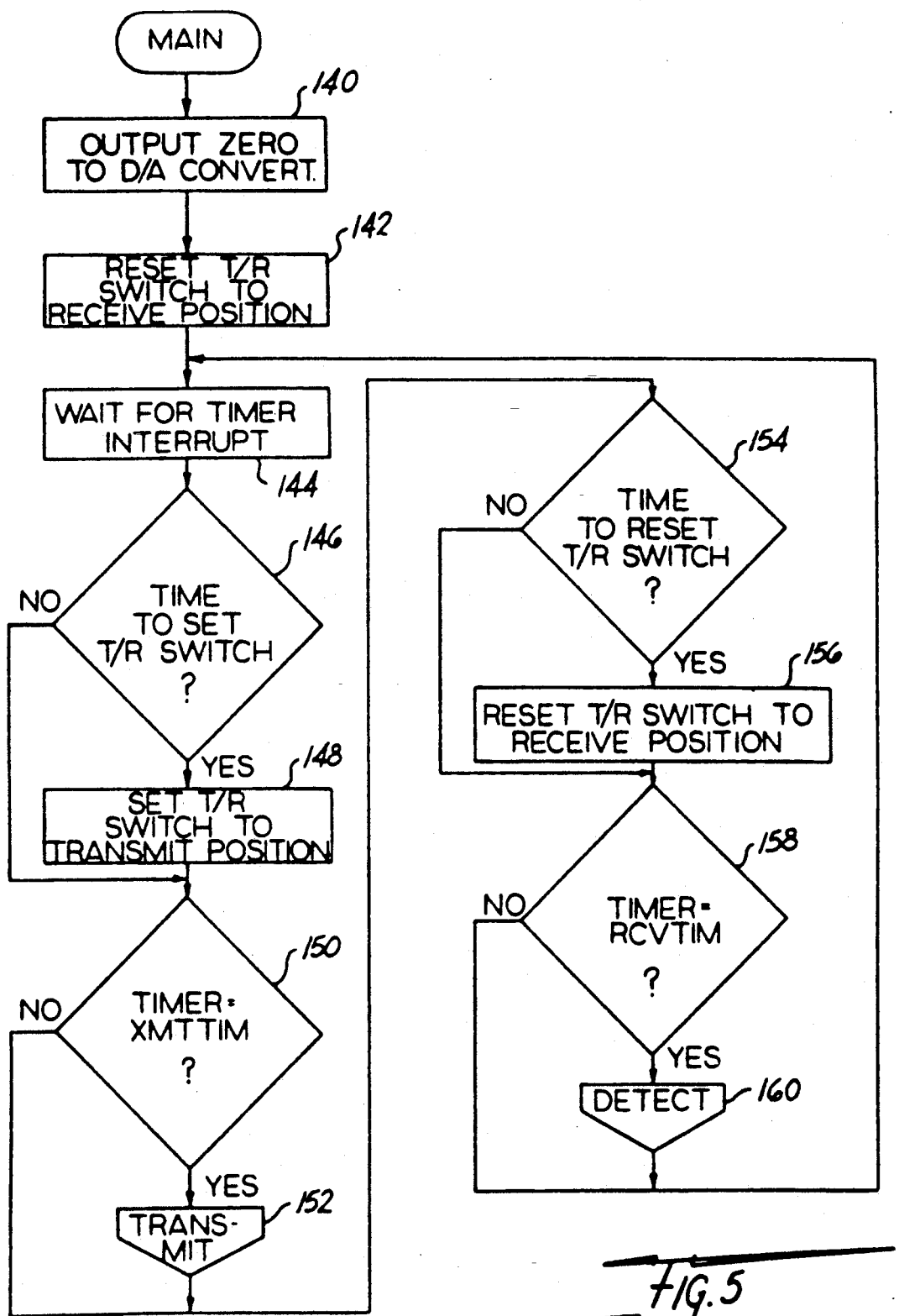

The scheduling of the transmit and detection routines is handled by a main routine shown in FIG. 5. The main routine runs upon a reset and continues running in a loop unless reset again. First, according to step 140, a digital word representing zero is put onto the data bus 46 of FIG. 1 and latched to the input of the D/A converter 50 by means of the latch control line 46 through latch 48. Next, step 142 resets the T/R switch 26 to its receive position via the control line 44. Program execution then enters the start of the loop, step 144. When a timer interrupt occurs (every 0.1 ms), the loop is executed one time. First, the routine determines in step 146 if it is time to set the T/R switch 26 to the transmit position and, if so, does so in step 148. In step 150 the time count TIMER is compared to the time to begin synthesis and transmission of a pulse XMTTIM. If there is a match, the transmit subroutine, shown in FIG. 2, is called to execute in step 152. If it is not time to transmit or if the transmit routine is finished executing, step 154 determines if it is time to reset the T/R switch 26 to the receive position. If so, step 156 resets the switch. In the preferred embodiment, the T/R switch 26 is maintained in the transmit position only long enough to ensure that the synthesized pulse can get through, or just over 0.5 ms. The T/R switch is in the receive position the rest of the time. In step 158, the time count TIMER is compared to a value RCVTIM representing the opening of an acceptance interval on a given receive channel. If there is a match, the detect subroutine, shown in FIG. 3, is called to execute by step 160. Otherwise or after the detect subroutine has finished, the loop is restarted at step 144.

For simplicity, the flowcharts discussed thus far are drawn depicting detection on a single channel. In fact, in the preferred embodiment, simultaneous detection on up to five channels is possible. Moreover, up to eight pulse detection events can be captured for each shot point. The eight pulse detection events are defined by values in eight receiver configuration registers representing preset conditions. The eight registers are in the processor's memory. In the preferred embodiment, each of the eight receiver configuration registers contains:

a) a receive channel number, selecting the in-phase and quadrature correlation coefficients to be used in the detection routine;

b) a receive threshold (THLD), defining the minimum correlation value to be used in peak detection;

c) a receive window open time (RCVTIM), defining the start of an acceptance window during which the detection routine runs;

d) a receive window close time (RCVCNT), defining the end of the acceptance window of c) relative to RCVTIM; and e) a bit defining that the apparatus is to operate as an autonomous responder by transmitting only in response to reception of the pulse defined by the foregoing a)-d).

Other presettable registers used in the preferred embodiment include:

a) the transmit configuration register, selecting the transmit channel N and the corresponding coefficients $c_N(i)$;

b) an interrogate interval register, containing a value (TCNT), which is the timer count modulus, so that whenever TIMER equals TCNT, TIMER is reset to zero, restarting a transmission interval;

c) an offset time register, containing a value (XMTTIM), which determines the time of transmission relative to the start of the transmission interval (TIMER=0); and d) a calibration register, containing a calibration value (CALTIM) that corrects the time of arrival of pulses for delays otherwise unaccounted for.

Upon detection of each of up to eight pulses according to the conditions set by each of the eight receiver configuration registers, the time of arrival (PLSTIM) and the signal strength (PLSLVL) of each are stored in memory. The time of arrival is stored in one of eight reception time registers; the signal strength is stored in one of eight signal strength registers. The eight reception time and signal strength registers correspond to the eight receive configuration registers. The time of arrival is computed with respect to the time of transmission XMTTIM by (RCVTIM+PLSTIM−XMTTIM+CALTIM).

Because the direct acoustic path is shorter than the reflected paths, the pulse over the direct path arrives at the detector earlier than pulses over reflected paths. By selecting the first net correlation peak within each acceptance interval, the detection routine solves the multipath problem.

The presettable registers are configured by an external controller over the communications interface 37 in FIG. 1. The values in the reception time and the signal strength registers are sent to the controller over the communications interface 37 to be used in solving acoustic ranges.

As discussed hereinbefore, the transmit signal set comprises a 0.5 ms pulse on five carrier frequencies: 55 kHz, 65 kHz, 75 kHz, 85 kHz, and 95 kHz. The actual pulse shape was derived by an iterative technique, known as the Parks-McClellan algorithm and described in the book *Digital Signal Processing* by Oppenheim and Schafer, Prentice-Hall 1975. The Parks-McClellan algorithm derives, for a finite pulse shape, an optimum approximation to a desired frequency spectrum. The actual output of the algorithm is a set of coefficients representing the magnitude of the pulse at equal intervals. Several criteria were used in designing the signal set. First, a finite-length, narrow pulse is desirable to maximize spatial resolution and minimize multipath interference. Second, the channel spacing required by the receiver to avoid cross-channel interference should be small to permit a given transducer to handle many channels for more flexible operation of the ranging system. It is well known in the art that the best receiver for a given set of transmitted signals is a matched filter receiver. A matched filter is defined as a filter whose impulse response has the same shape as the signal to which it is matched, but reversed in time. For symmetrical transmit pulse, which is identical time-reversed, the impulse response is identical to the shape of the signal to which it is matched. Likewise for a symmetrical transmit pulse, the matched filter receiver has a frequency response identical to the frequency spectrum of the pulse. Thus, selecting the receiver's desired frequency response also sets the frequency spectrum of the pulse. A further point about matched filters is that they cannot be realized in linear analog systems because the reverse time impulse response cannot be realized.

In FIG. 6 is shown the desired frequency response 170 of a given receive channel and the actual response 172 approximating the desired for the Parks-McClellan-generated pulse shape. The desired frequency response 170 can be seen to have a symmetrical triangular shape decreasing from its 0 dB peak at the carrier frequency to 80 dB down at the adjacent channel's carrier frequencies and remaining constant at 80 dB down on beyond. The actual response 172 represents an approximation to the desired that actually yields a worse-case cross-channel rejection of 60 dB. The good cross-channel rejection permits the receiver channels to be separated by only 10 kHz, thereby allowing one high-frequency transducer to be used. The bandwidth of the actual frequency response 172 of the receiver channel, which is the same as that of the pulse to which it is matched, is about 10 kHz. FIG. 7a shows the overlap of the desired frequency responses of the five channels and the efficient use of the available spectrum from 50 kHz to 100 kHz. In an analog implementation, five separate bandpass filters would be required, each comprising a number of components.

Plots of the transmit pulse envelope 180 and of the transmit pulse on a carrier frequency of 95 kHz 182 are shown in FIG. 8. Each of the plots is of about 200 values. In the preferred embodiment 203 are used. If each of the 203 values plotted for the envelope is designated $c_E(i)$, the transmit coefficients for each channel are given by $$c_N(i) = c_E(i)\cos[2\pi(f_N/f_t)i],$$

where $f_t = 400$ kHz, the transmit sampling frequency, $f_N$ = the carrier frequency for channel N, and i runs from $-101$ to $+101$. The processor 36 synthesizes a transmit pulse on channel 5, for example, by sending consecutive coefficients $c_5(i)$ to the D/A converter 50 at a rate of 400000 coefficients per second. The result is a transmitted pulse having the shape 182 shown, but further smoothed by the reconstruction filter 56. By synthesizing pulses from digital words converted at a rate four times that of the highest significant transmitted frequency (100 kHz), the digital switching noise can be effectively eliminated by a third-order lowpass Bessel filter 56. A Bessel filter is used to minimize phase distortion in the filtering process. Slower conversion rates would require more complex and costly higher order filters.

Although the pulse envelope of the preferred embodiment has a total duration of about 0.5 ms, most of its energy is within a 0.1 ms window bracketing the center of the pulse envelope. Consequently, it is possible to achieve a time resolution of about 0.1 ms, which corresponds to a spatial resolution of about 0.15 m in sea water. The narrow pulses also make it possible to resolve desired pulses from reflected pulses for differences in path length equivalent to about 0.1 ms, allowing the detector to discriminate between direct and reflected pulses, thereby effectively eliminating the multipath problem.

A general rule in designing a sampled data receiver is that the sampling frequency should be at least twice the highest frequency present in the signals to be received in order to avoid what is known as aliasing. Aliasing is the phenomenon whereby a frequency component $f_a$ sample at another frequency $f_b$, where $f_b < 2f_a$, appears to be a component shifted to a frequency $f_3 = f_b - f_a$. If another frequency component is actually at $f_3$, it is said to be aliased by the shifted component. It is impossible to distinguish the two separate components. If the general rule were followed in the preferred embodiment, the sampling frequency $f_s$ of the A/D converter 30 would have to be about 200 kHz. Such a high sampling frequency would make a five-channel receiver difficult to implement. In the preferred embodiment, the known frequency shifting properties are taken advantage of to permit a slower sampling frequency. The undersampling of signals occupying a band from 50 kHz to 100 kHz at a rate of 100 kHz shifts those signals into the band from 0 Hz to 50 kHz. In fact, the spectrum above 50 kHz is folded about 50 kHz (one-half the sampling frequency). For this undersampling technique to work, highpass filter 28 is used to eliminate pre-sampled energy from the 0 Hz to 50 kHz band to avoid aliasing. A cut off frequency of about 40 kHz minimizes phase distortion in the passband, while adequately attenuating noise in the stopband. The 50 kHz-100 kHz spectrum of FIG. 7a is converted to the 0 Hz-50 kHz spectrum of FIG. 7b. The transmitted channel 1 carrier frequency of 55 kHz, when sampled at 100 kHz, appears as a frequency of 45 kHz in the shifted spectrum; the carrier frequencies of the other channels appear as: channel 2—35 kHz, channel 3—25 kHz, channel 4—15 kHz, and channel 5—5 -kHz. The natural filtering of high frequencies by sea water and the 12 dB/octave transducer roll-off above 100 kHz minimize the effects of the aliasing of even higher noise frequencies into the 0–50 kHz band.

A transmit pulse synthesized from 203 400 kHz coefficients is sampled in the receiver at a 100 kHz rate and correlated against in-phase and quadrature sequences of 50 coefficients each. The in-phase and quadrature receiver coefficients hi(k) and hq(k) are plotted in FIG. 9 for channel 5. The in-phase sequence of coefficients hi(k) is generated by multiplying the shape of the envelope 180 by a 5 kHz sinusoidal waveform with its peak coincident with the peak of the envelope and selecting 50 samples of the resulting waveform 190 spaced every 0.01 ms. The quadrature coefficients are generated similarly, except that the envelope 180 is multiplied by a 5 kHz sinusoid shifted by 90°. The plot 192 of the resulting sequence hq(k) is shown in FIG. 9.

The quadrature detection scheme shown in FIG. 10 correlates 50 consecutive samples x(k) from the A/D converter 30 spanning 0.5 ms against two sequences of 50 coefficients hi(k) and hq(k) in correlators 200 and 202. (Except for the A/D converter 30, the remaining blocks of FIG. 10 are implemented in program code.) The resulting correlation values yi(j) and yq(j) are squared in squarers 204 and added in summer 206. Finally, the net correlation value y(j) is derived by square root block 208. It should be appreciated that the square-root block 208 is used merely to scale the net correlation value to the same units as the sampled input. A big advantage with using a matched filter in the detection scheme is that the y(j) sequence is the autoccorrelation function of the transmit pulse envelope. An interesting property of the autocorrelation function of a symmetrical pulse is that it is also symmetrical, but twice as wide. Because the autocorrelation function defined by the sequence y(j) is twice as wide in time, its frequency spectrum is about half that of the pulse. It should be remembered that the bandwidth of each of the transmit pulses is about 10 kHz, making the bandwidth of the autocorrelation function about 5 kHz. Consequently, the correlation computations need be performed only at a rate $f_k$ of 10 kHz to avoid aliasing of the correlation function. Thus, an advantage with using a matched filter receiver is that the output of the correlator can be sampled at the same rate as the bandwidth of the transmitted signals instead of at twice the bandwidth as in non-matched filter receivers. The advantage greatly reduces the number of correlation computations required.

A typical sequence of net correlation values y(j) spanning the arrival of a pulse is plotted in FIG. 11. It should be noticed that the envelope of the plotted values in FIG. 11 describes the autocorrelation function of the transmit pulse envelope and is twice as wide as the pulse. The peak detector 209 in FIG. 10 selects the maximum y(j) from the sequence, which represents the arrival of a pulse.

Preforming the many computations of a multi-channel system requires a processor capable of high performance. In the preferred embodiment, a digital-signal-processing (DSP) integrated circuit is used to synthesize the transmitted pulses and to detect the received pulses. An example of such a DSP chip is the DSP 56000, manufactured by Motorola, Inc., Schaumburg, Ill. To unburden the DSP chip further so that it can perform more efficiently, a low-cost microcontroller is used to handle other functions, such as timing and communications over the communications interface 37 and reading the data acquisition module 35. An example of such a microcontroller is the Motorola MC68HC11A1, also manufactured by Motorola, Inc., Schaumburg, Ill. Thus, the processor 36 of the preferred embodiment comprises a DSP chip for pulse synthesis and detection, a microcontroller for general input/output, timing, communications, and control, and their associated memories.

Figure 12:
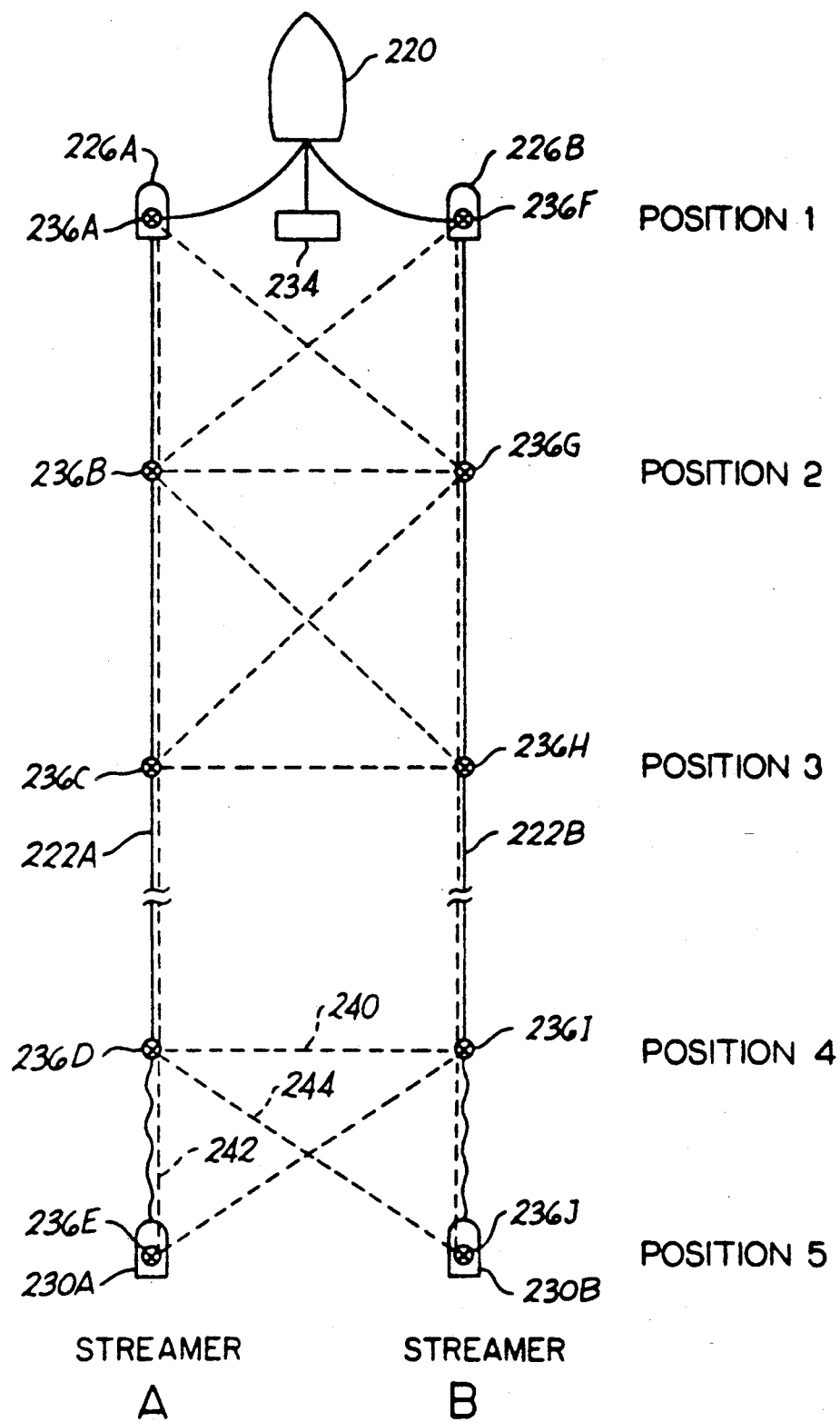
FIG. 12 is an overhead view of the deployment of transceivers used in this invention.

Referring to FIG. 12, there is shown an overhead view of a seismic tow boat 220 trailing two submerged hydrophone streamers 222A and 222B. Head buoy 226A and tail buoy 230A are tethered to streamer 222A at its front and rear respectively. The floating buoys 226A and 230A are used as surface references marking the ends of the submerged streamer 222A. Streamer 222B is similarly marked by its head buoy 226B and its tail buoy 230B. Hydroacoustic transceiver pods 236A–J, including the apparatus of the invention, are shown attached to the submerged streamers 222A and 222B at POSITIONS #2–4, to the head buoys 226A and 226B at POSITION #1, and to the tail buoys 230A and 230B at POSITION #5. For the purposes of simplifying the illustration of FIG. 12, transceivers 236A–J are shown attached to only two streamers 222A and 222B and to their buoys 226A–B and 230A–B. In a typical seismic survey, additional transceivers could also be attached to the hull of the tow boat 220 and to the air gun 234. These additional transceivers would typically be connected by a communications link to the external controller, but could be operated as responders if appropriate. If, moreover, the vertical thermal profile of the sea excludes an acoustic path between the transceivers on the buoys and those on the streamer, towfish-mounted transceivers can be towed beneath the buoys to complete a relay acoustic path. Furthermore, more than two streamers could be deployed, each with many more transceivers than shown in FIG. 12 distributed along its length. A typical 3 km streamer may have about six transceivers along its length.

Transceivers 236B, C, D and 236G, H, I which are attached directly to the streamer, can communicate with a controller aboard the tow boat 220 through communication lines in the streamers 222A and 222B. In most applications, the buoys are tethered to the streamers without any electrical connection along the tether. Consequently, buoy-mounted transceivers usually cannot communicate with the controller. For the purposes of illustration, let us assume that transceivers 236A, E, F, and J in FIG. 12 cannot communicate with the controller. The buoy-mounted transceivers are configured as responders, which transmit only upon detection of a pulse on a designated channel. Dashed lines in FIG. 12 represent ranges between pairs of transceivers 236. In a typical deployment, all of the transceivers on streamer 222A are configured to transmit on the same channel and all those on streamer 222B on another channel. The responders in the buoys are configured to transmit in response to reception of a pulse on the same channel as it transmits on. Each transceiver, excluding the responders, is configured to receive pulses from its neighboring transceivers. For example, transceiver 236B is configured to receive five pulses: from 236A, C, F, G, and H. The pulse transmission times are staggered to prevent pulses on the same channel from arriving simultaneously at the same transceiver. In a typical deployment, transceivers directly across from one another would transmit more or less together, the one nearest the boat first on through those farthest from the boat.

The range between a pair of transceivers in the preferred embodiment is measured by two-way ranging to avoid the need for an accurate sync command. In two-way ranging, each transceiver transmits a pulse, the first at time $t_{1x}$ referenced to transceiver #1's timer and the second at time $t_{2x}$ referenced to transceiver #2's timer. The first receives the second's pulse at time $t_{1r}$, and the second receives the first's pulse at time $t_{2r}$. Even if the timers of the two transceivers are not synchronized, the range is proportional to $[(t_{1r}-t_{1x})+(t_{2r}-t_{2x})]/2$, because the offset between the two timers is removed by the subtraction. The time differences $(t_{1r}-t_{1x})$ in transceiver #1 and $(t_{2r}-t_{2x})$ in transceiver #2 are the values sent over the communications interface 37 to the external controller. The external controller then computes the range as $c[(t_{1r}-t_{1x})+(t_{2r}-t_{2x})]/2$, where c is the speed of sound through the water. The computation described applies to the range 240 in FIG. 12 between transceivers 236D and 236I which can communicate with the external controller aboard the towboat 220.

In determining ranges between a transceiver and a responder, the computation is different. For a range between a transceiver #3 and a responder #4 on the same streamer, where the responder is configured to transmit in response to detection of a pulse from transceiver #3, the range 242 is proportional to $[(t_{3r}-t_{3x})-t_d]/2$. The difference $(t_{3r}-t_{3x})$, which transceiver #3 reports to the external controller, is the interval between transceiver #3's pulse transmission and the reception of the pulse from responder #4. A delay $t_d$, equivalent to XMTTIM+CALTIM, inherent in all responders between a responder's detection of a pulse and its subsequent transmission is known by the controller and taken into account in computing the range. This computation applies to the range 242 between transceiver 236D and responder 236E in FIG. 12.

For the range 244 between transceiver 236D and responder 236J, in which the responder transmits in response to detection of a pulse from a transceiver other than 236D, namely from transceiver 236I, the computation is more complicated. To simplify the format of the range equations used in this case, let us use a subscript of I to refer to transceiver 236I, a subscript of J to refer to responder 236J, and a subscript of D to refer to responder 236D. The range 244 is proportional to:

$$(t_{IrJ}-t_{Ix})-(t_{IrD}-t_{Ix})-t_d$$

$$-[(t_{DrJ}-t_{Dx})-t_d]/2$$

$$+[(t_{IrD}-t_{Ix})+(t_{DrI}-t_{Dx})]/2,$$

where $(t_{IrJ}-t_{Ix})$ is the time of arrival at 236I of the pulse from responder 236J with respect to the time of transmission of the pulse from 236I, $(t_{IrD}-t_{Ix})$ is the time of arrival at 236I of the pulse from transceiver 236D with respect to the time of transmission of the pulse from 236I, $(t_{DrJ}-t_{Dx})$ is the time of arrival at 236D of the pulse from responder 236J with respect to the time of transmission of the pulse from 236D, $(t_{DrI}-t_{Dx})$ is the time of arrival at 236D of the pulse from the transceiver 236I with respect to the time of transmission of the pulse from 236D, and $t_d$ is the inherent delay in a responder between reception and transmission of a pulse.

The terms in parentheses are times of arrival sent to the external controller via the communications interface and $t_d$ is a known value. From these terms, the external controller can compute the range 244.

An essential element in the complete position solution is the depth of each transceiver at the time of a range measurement. For this reason, the data acquisition module 35 in FIG. 1 of the preferred embodiment can transfer depth information from a pressure transducer to the processor 36, which sends it on to the external controller over the communications interface 35. Along with depth data, the data acquisition module can provide temperature information from a temperature sensor, which can similarly be sent to the external controller for use in estimating the local speed of sound.

Referring again FIG. 1, the invention of this system could be used as a one-way ranging system by the use of an external sync signal provided to the processor 36. The external sync signal is used to reset the time count of the timer to zero. The sync signal interrupts the execution of the processor and immediately resets the time count of the timer to zero. In addition, each transceiver would be configured as a dedicated receiver or transmitter.

Thus there has to this point been described apparatus and methods for a hydroacoustic positioning system, and although the present invention has been described with respect to such specific methods and apparatus, it is not intended that such specific references be considered limitations upon the scope of the invention except insofar as is set forth in the following claims.

What is claimed is:

1. A method for determining acoustic ranges between individual hydroacoustic transceiver locations on a plurality of underwater objects, comprising the steps of:
   a) affixing a plurality of individual hydroacoustic transceivers to different locations on underwater objects, said hydroacoustic transceivers having timing clocks and storage means and being operable to transmit and receive acoustic pulses having a predetermined range of characteristics through the water;
   b) establishing pulse characteristics including pulse shapes, transmission times, carrier frequencies, and reception windows open during predetermined time periods for reception of said pulses on individual carrier frequencies in the transceivers;
   c) composing a schedule of pulse transmission times and pulse reception windows for the plurality of transceivers;
   d) synchronizing the timing clocks in the transceivers periodically at predetermined times;
   e) transmitting after each periodic synchronization pulses of said predetermined range of shapes and associated carrier frequencies according to the schedule of pulse transmission times to corresponding pulse reception windows to enable detection of the scheduled pulses having the predetermined range of shapes and carrier frequencies arriving during the opening of the pulse reception windows; and
   f) determining reception times of detected pulses of predetermined characteristics according to the clocks in the receiving transceivers.

2. The method of claim 1, further comprising the step of transmitting the pulse reception times from the transceivers.

3. The method of claim 2, further comprising the step of computing the acoustic ranges between the transceiver locations by comparison of the pulse reception times and the pulse transmission times.

4. The method of claim 1, further comprising the step of establishing further for received pulses, a receive threshold level defining minimum pulse amplitudes necessary to enable detection of the scheduled pulses.

5. The method of claim 1, wherein the step of composing a schedule of pulse transmission times and pulse reception windows for each of the plurality of transceivers comprises storing each individual schedule in the storage means of the corresponding transceiver.

6. The method of claim 1, further comprising the step of configuring for response to said schedule at least one of the transceivers as a transmitter and at least one of the transceivers as a receiver.

7. The method of claim 1, including the steps of firing periodic seismic shots to transmit seismic energy and relating the predetermined times of synchronizing the timing clocks in the transceivers to the seismic shot rate.

8. A hydroacoustic ranging system used for determining acoustic ranges between individual hydroacoustic transceiver locations on a plurality of underwater objects, comprising: a plurality of hydroacoustic transceivers attached at different locations to said underwater objects, each of said transceivers including:
   a) a hydroacoustic energy to electric energy transducer adapted for underwater transmission and reception of hydroacoustic pulses;
   b) an electronic system coupled to the transducer for transmitting and receiving hydroacoustic pulse energy including means for processing pulses within a predetermined range of shapes and carrier frequencies;
   c) pulse shape determination means in said electronic system for determining the shape of pulses received by the transducer;
   d) means for assigning times of arrival to the pulses having a predetermined shape and carrier frequency received by the transducer;
   e) pulse synthesizing means in the electronic system for producing a waveform of predetermined shape and carrier frequency for transmission from said transducer at a time different from the arrival of pulses;
   f) clock means for producing periodic times counts; and
   g) means for synchronizing the clock means of said plurality of hydroacoustic transceivers to each other.

9. The hydroacoustic ranging system of claim 8, further comprising scheduling means for scheduling a sequence of pulse transmission and reception events.

10. The hydroacoustic ranging system of claim 9, wherein said scheduling means comprises storage means in each said transceiver for storing time counts representative of pulse transmission times and time counts representative of pulse reception windows and means for enabling said pulse shape determination means to determine the shapes of pulse received by the transducer during opening of said windows.

11. The hydroacoustic ranging system of claim 9, wherein said scheduling means comprises means for initiating the sequence of pulse transmission and reception events and for synchronizing said clock means in response to receipt of a synchronizing pulse.

12. The hydroacoustic ranging system of claim 9, further comprising storage means in each of said transceivers, a central controller, and communication means for downloading said sequence of pulse transmission and reception events into said storage means.

13. The hydroacoustic ranging system of claim 8, further comprising a central controller and reception means for communicating the times of arrival of pulses from the plurality of transceivers to the central controller.

14. The hydroacoustic system of claim 8, wherein said synchronizing means issues a synchronizing signal to the plurality of transceivers at a regular periodic rate defining shot intervals between successive synchronizing signals.

15. The hydroacoustic ranging system of claim 8, wherein said means for synchronizing establishes a zero time count in said clock means in each of said plurality of transceivers.

16. The hydroacoustic ranging system of claim 8, wherein said means for assigning times of arrival assigns a time count value from the clock means coincident with an indication from said pulse shape determination means of the reception of a pulse of predetermined shape and carrier frequency.

17. The hydroacoustic ranging system of claim 10, wherein said scheduling means comprises means for comparing the time counts stored in said storage means with time counts produced by said clock means to schedule pulse transmission and reception events in synchronizm with detected matches between stored time counts and counts of said clock means.

18. The hydroacoustic ranging system of claim 8, wherein said plurality of transceivers comprises means for configuring at least one of said transceivers as a transmitter and at least one of said transceivers as a receiver at a predetermined times.

19. The hydroacoustic ranging system of claim 12, further comprising means for determining the acoustic ranges between said transceivers from the transmission times of pulses and the times of arrival of the transmitted pulses.

20. The method of determining an underwater acoustic range between a first and a second hydroacoustic device, comprising the steps of:
   a) deploying a first and a second hydroacoustic device at different underwater positions, each of said devices having storages means and timing clocks, said first device being operable to transmit acoustic pulses having a predetermined range of characteristics through the water, said second device being operable to receive acoustic pulses having said predetermined range of characteristics;
   b) establishing pulse transmission characteristics including pulse shapes, transmission times, and carrier frequencies and storing said transmission characteristic in the storage means of said first device to compose a schedule of pulse transmission times of pulses having the established transmission characteristics;
   c) establishing corresponding pulse reception characteristics including pulse shapes, carrier frequencies, and reception windows open during predetermined time periods for reception of pluses with said corresponding pulse reception characteristics transmitted by said first device and storing said reception characteristics in the storage means of said second device to compose a schedule of pulse reception windows in said second device;

d) synchronizing said timing clocks in said first and second devices periodically at predetermined times to initiate in each of said devices a sequencing through the schedule stored in the storage means;

e) transmitting a pulse from said device according to the schedule stored in the storage means of said first device at one of said transmission times;

f) enabling detection of the pulse transmitted by said first device during the opening of a corresponding one of said pulse reception windows according to the schedule in said said second device and assigning a time of arrival coincident with pulse detection; and g) determining the acoustic range between said first and second transceivers by comparing the time of arrival of the pulse to the transmission time.

21. A method for determining acoustic ranges between individual hydroacoustic transceiver locations on a plurality of underwater objects, comprising the steps of:

a) affixing a plurality of individual hydroacoustic transceivers to different locations on underwater objects, said hydroacoustic transceivers having timing clocks and storage means and being operable to transmit and receive acoustic pulses having a predetermined range of characteristics through the water;

b) establishing pulse characteristics including pulse transmission times, carrier frequencies, and reception windows open during predetermined time periods for reception of said pulses on individual carrier frequencies in the transceivers;

c) composing a schedule of pulse transmission times and pulse reception windows for the plurality of transceivers;

d) storing an individual schedule for each transceiver in the storage means of the corresponding transceiver;

e) synchronizing the timing clocks in the transceivers periodically at predetermined times;

f) transmitting after each periodic synchronization pulses of said predetermined range of characteristics according to the schedule of pulse transmission times to corresponding pulse reception windows to enable detection of the scheduled pluses having the predetermined range of characteristics arriving during the opening of the pulse reception windows; and g) determining reception times of detected pluses of predetermined characteristics according to the clocks in the receiving transceivers.

22. A hydroacoustic ranging system used for determining acoustic ranges between individual hydroacoustic transceiver locations on a plurality of underwater objects, comprising a plurality of hydroacoustic transceivers attached at different locations to said underwater objects, each of said transceivers including:

a) a hydroacoustic energy to electric energy transducer adapted for underwater transmission and reception of hydroacoustic pulses;

b) an electronic system coupled to the transducer for transmitting and receiving hydroacoustic pulse energy including means for processing pulses within a predetermined range of characteristics;

c) pulse detection means in said electronic system for detecting pulses received by the transducer;

d) means for assigning times of arrival to the pulses having characteristics within a predetermined range of characteristics received by the transducer;

e) pulse synthesizing means in the electronic system for producing a waveform of predetermined characteristics for transmission from said transducer at the time different from the arrival of pulses;

f) clock means for producing periodic time counts;

g) means for synchronizing the clock means of said plurality of hydroacoustic transceivers to each other; and h) scheduling means in each transceiver for scheduling a sequence of pulse transmission and reception events and for initiating said sequence of events in response to a synchronizing pulse from said means for synchronizing.

* * * * *